Patented Oct. 19, 1948

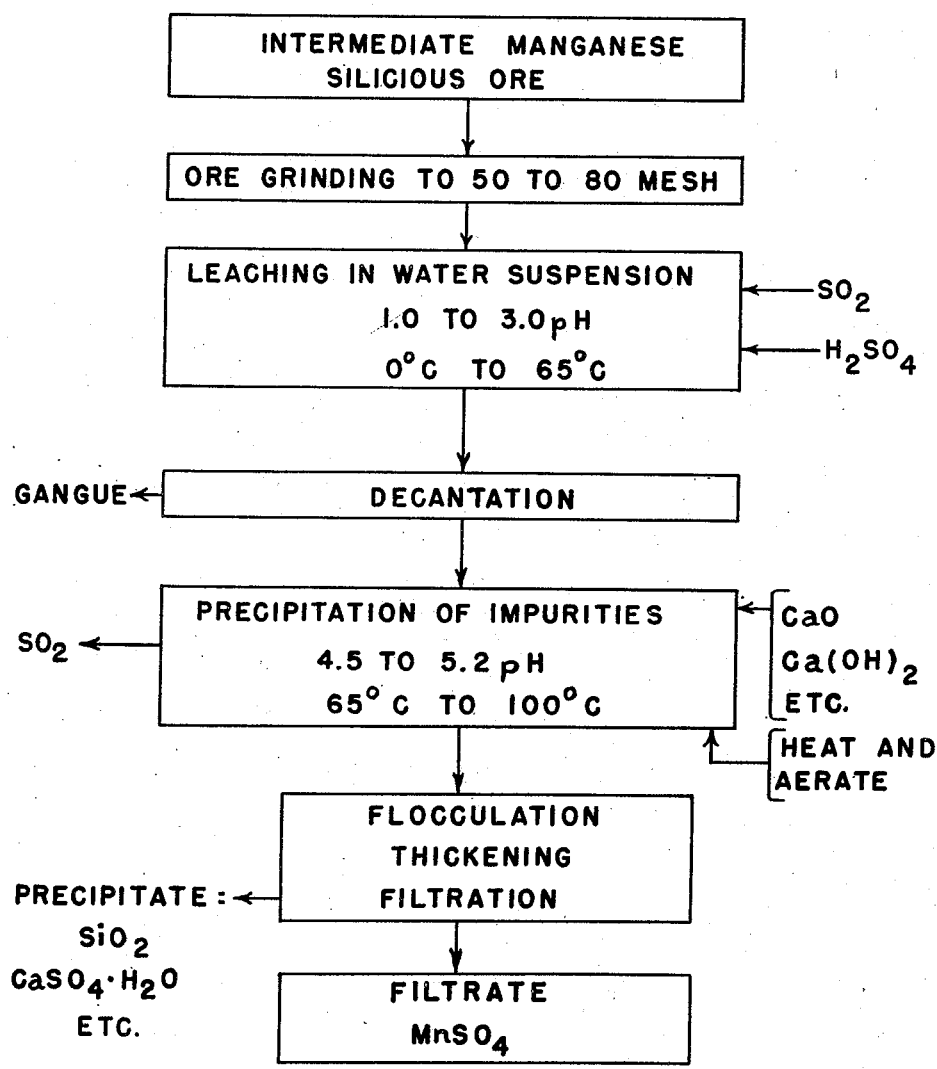

2,451,647

UNITED STATES PATENT OFFICE 2,451,647

PROCESS OF TREATING INTERMEDIATE MANGANESE SILICEOUS ORES

John R. Allen, Seattle, Wash., assignor to Manganese Products, Inc., Seattle, Wash., a corporation of Washington Application December 21, 1944, Serial No. 569,204

14 Claims. (Cl. 23—117)

The present invention relates to improvements in process of treating intermediate manganese silicious ore such as is found on the Olympic Peninsula of Washington, to obtain a manganese sulphate solution.

It has been known in the prior art to roast an intermediate manganese silicious ore to change the valence of some of the manganese, as shown by Albin, 2,191,819, and Davis, infra, to treat an intermediate manganese oxide without constituent silica, with both sulfuric acid and sulfur dioxide, as shown by Westling, 1,325,129; and Bradley, 1,951,341, teaches the use of a reduction roast on the dioxide without constituent silica.

C. W. Davis, in reporting upon certain investigations, "Dissolution of Various Manganese Minerals," U. S. Bureau of Mines, R. I. 3024, July, 1930, states that, page 2, "Solutions of numerous reagents such as the following (alone or together and with or without heat) have been proposed for the dissolution of manganese: $H_2SO_4$, $SO_2$, ..." Davis further states, page 7, that ". . . . all the manganese minerals tested with the exception of rhodonite may be dissolved readily in two percent $SO_2$ solution. ..."

Westling, 1,325,128, also found that he obtained in solution, page 2 line 47, "ferric sulphate and alumina as sulphate, as well as phosphoric acid, and other impurities, if such were contained in the ore. The solution is then treated with powdered lime stone to precipitate ferric hydroxide and hydroxide of alumina, if present, as well as phosphoric acid as ferric phosphate. . . . This solution . . . will only contain manganese sulphate, and a little calcium sulphate. The next steps consists in adding calcium nitrate . . . to produce . . . calcium sulphate which will precipitate, and . . . manganese nitrate . . . in solution . . . A small amount of calcium sulphate will necessarily remain in solution . . ."

Libby, 1,770,791, also discloses these same difficulties and uses much the same method.

This condition of the prior art is borne out by the recent work of the Bureau of Mines, R. I. 3609, January 1942, Manganese Investigation, Metallurgical Division, and a later work R. I. 3649.

It will thus be seen that some ores containing manganese oxides may be acted upon by sulfurous and sulfuric acids to produce manganese sulfate in solution, but that the presence of impurities in the resulting solution is of primary importance. This is particularly true when it is considered that the removal of these impurities to the extent possible by the prior art, involved the locking up and waste in the precipitates of large quantities of the reagent, such as the sulfate radical. In addition to the impurities mentioned above in connection with the prior art, most of the ores of manganese contain iron as a hematite, and calcium as lime stone, as well as silica, with water of hydration attached to and probably linking many of the compounds.

By the term "intermediate manganese ores" applicant means those ores in which the manganese in the form of manganese oxides is found to have two different valences, usually two and four, as is probable in $Mn_3O_4$, or the ore may be a mixture of manganous and manganic oxides. "Intermediate" manganese silicious ores are ores in which the silica is a constituent of the ore and is loosely linked to the manganese by water of crystallization. The ore may be either a natural ore or one upon which some other process has been previously effected.

It is believed that many of the manganese ores of the Olympic Peninsula are intermediate hydrated manganese silicious ores, that is, the silica is linked to the manganese by water of hydration, and when Olympic ores are referred to, this is what is meant.

Having in mind these defects of the prior art, it is an object of the present invention to treat intermediate hydrated manganese silicious ores, Olympic ores, with both sulfuric and sulfurous acids to obtain a manganese sulfate solution in a pure state, or containing other soluble compounds.

A further object of the present invention is the prevention of the loss of the sulfur reagent by locking up with the impurities in the ore.

Another object of the present invention is the controlling of the pH and temperature of the leach to prevent certain compounds from coming into solution and to aid in bringing the manganese into solution.

A still further object of the present invention is the controlling of the pH and temperature of the solution and suspensions to precipitate out of the solution certain impurities and to retain in the solution the manganese.

The above defects of the prior art are remedied and these objects attained by a process which will be understood by reference to the accompanying description and drawings showing a flow sheet depicting the treatment of intermediate hydrated manganese silicious ores in accordance with my invention.

An example of my process, in which the various steps are carried out as a continuous flow as distinguished from a batch operation, is shown in the drawing, in which:

Olympic ore is shown as first being crushed and ground, wet or dry, to a fineness such as will pass a 50 mesh screen, but little will pass an 80 mesh, the desired speed of reaction largely controlling the size of the grind. Too fine a grind has a tendency with some ores to cause sliming.

The ground ore is placed in water suspension and then subjected to leaching by sulfur dioxide and sulfuric acid, either together or in series, the preferred form being of concomitant leaching, as the sulfuric acid leaches the manganous oxide and the sulfurous acid leaches the manganic oxide. In the leaching process some of the sulfurous acid will be oxidized to sulfuric acid, reducing the amount of sulfuric that is required.

The leaching is carried out at a temperature between 25 and 50 degrees C. and at a pH between 1.0 and 3.0. This temperature range is an optimum, as the extremes are those of the freezing point of the solution and its boiling point. The speed of the reaction will increase with increasing temperature of the solution, and the solubility of the sulfur dioxide will decrease with increasing temperature of the solution. For these reasons, a compromise is made between the speed of reaction and the solubility of the $SO_2$. The pH of the leaching solution is also somewhat of a compromise, as the cost of maintaining a high concentration is increased by depreciation of the equipment and the loss of reagents by subsequent neutralizing, while these costs are offset by the increased speed of the reaction. These conditions are old and well recognized physical characteristics present in the use of the acids of sulfur.

Following this leaching, which takes from two to four hours, the gangue may be removed by thickening the solution, or the gangue may be carried along and removed with the precipitated soluble impurities. The precipitation of the soluble impurities is obtained by raising the pH to between 4.5 and 5.2 and maintaining the temperature between 65 and 100 degrees C. The pH may be raised by the use of lime, slaked lime, lime stone, similar salts of barium, talc, the manganese ore which usually contains some lime stone, or any alkaline magnesium mineral such as magnesite, dolomite, olivine or brucite; those compounds containing lime being preferred because of the occluding effect on the silica. Also the manganese oxides of the ore will react with some of the acid present in the solution.

Soluble impurities present will be, among others, phosphorus, and iron and alumina as sulfates. There will also be traces of copper, cobalt, and nickel which will precipitate with this treatment. Raising the pH as above described causes the formation of calcium sulfate which, along with the reduced acidity of the solution, flocculates and reduces the colloidal properties of the silica to cause its precipitation and to increase the filterability of the silica.

Following the raising of the pH to precipitate soluble impurities, the mixture is flocculated, thickened, and then filtered.

Heating and aerating the solution will aid in the precipitation of some of the soluble impurities, particularly iron.

A further object of the present invention is the control of the precipitation of iron so that if desired, quantities may be carried along with the manganese solution without other contaminating factors.

If the iron is to be maintained in solution but other impurities, including silica, precipitated, then the temperature is raised to between 50° C. and 70° C., with a 4.0 to 4.5 pH. No aeration is had, and very little stirring so as to reduce aeration. Variations in pH and oxidation will govern the amount of iron maintained in solution, and the amount that may be precipitated with the manganese.

The oxidation of the solution may be carried out either by aeration or by the addition of an oxidizing compound. Raising the pH of the manganese sulfate solution above 6.5 will bring about a precipitation of the manganese, and for this reason it is necessary that the pH of the solution be maintained below 6.5 and preferably between 4.5 and 5.2. The above temperatures and pH's are critical for other reasons, some of which is that if the leaching takes place at high temperatures and high pH's, above those set forth herein as being desirable, there is a tendency for the ore to slime, and for the silica which has been loosely linked to the manganese by water of hydration to form a jell which further hinders leaching and the working of the mass. If the pH and temperature of the solution are not raised and the material flocculated, in the later step of precipitating impurities, the silica will not precipitate and cannot be subsequently removed as readily as is necessary if an economical filtration or separation of silica and impurities from the manganese sulfate solution is to be had. The use of a pH between 5.2 and 6.5 is effective in removing all impurities, but if not carefully controlled, may precipitate some manganese.

No mention is made of $SO_2$ recovery, as such does not form part of the present invention and the amount recoverable is small.

Claims 1 to 12, inclusive, appended hereto, have been copied from the patent of W. W. Jukkola, 2,340,188, January 25, 1944, Class 75—115.

Having thus described my invention, I claim:

1. In the method for recovering manganese from manganese bearing ores containing silica, the step of treating an ore pulp mass including a sulfuric acid containing manganese sulfate solution which contains silica in a dissolved and dispersed state with a basic material capable of forming a precipitate upon reaction with said acid in such amount as to only partially neutralize said acid to thereby cause the precipitate formed by reaction of the basic material with said acid and carrying the silica interspersed therewith to be thrown out of said solution.

2. In the method for recovering manganese from manganese bearing ores containing silica, the step of treating an ore pulp mass including sulfuric acid containing manganese sulfate solution which contains silica in a dissolved and dispersed state with a basic material capable of forming a precipitate upon reaction with said acid in such amount as to neutralize said acid to a degree such that the acidity of said solution corresponds to a pH value of between 4.5 and 5.2 to thereby cause the precipitate formed by reaction of the basic material with said acid and carrying the silica interspersed therewith to be thrown out of said solution.

3. In the method for recovering manganese from manganese bearing ores containing silica, the step of treating an ore pulp mass including sulfuric acid containing manganese sulfate solution which contains silica in a dissolved and dispersed state with a basic material capable of forming a precipitate upon reaction with said acid and selected from the group consisting of calcium oxide, calcium hydroxide, calcium carbonate, in such amount as to neutralize said acid to a degree such that the acidity of said solution corresponds to a pH value between 4.5 and 5.2 to thereby cause the CaSO₄ precipitate formed by reaction of the selected calcium compound with said acid and carrying the silica interspersed therewith to be thrown out of said solution.

4. In the method for recovering manganese from manganese bearing ores containing silica, the steps of treating an ore pulp mass including a sulfuric acid containing manganese sulfate solution which contains silica in a dissolved and dispersed state with a basic material capable of forming a precipitate upon reaction with which acid in such amount as to neutralize said acid to a degree such that the acidity of said solution corresponds to a pH value of between 4.5 and 5.2 to thereby cause the precipitate formed by reaction of the basic material with said acid and carrying the silica interspersed therewith to be thrown out of said solution, and flocculating the mass to facilitate the throwing out of the precipitate carrying silica from the solution.

5. In the method for recovering manganese from manganese bearing ores containing silica, the steps of treating an ore pulp mass including a sulfuric acid containing manganese sulfate solution which contains silica in a dissolved and dispersed state with a basic material capable of forming a precipitate upon reaction with said acid and selected from the group consisting of calcium oxide, calcium hydroxide, calcium carbonate, in such amount as to neutralize said acid to a degree such that the acidity of said solution corresponds to a pH value of between 4.5 and 5.2 to thereby cause the CaSO₄ precipitate formed by reaction of the selected calcium compound with said acid and carrying the silica interspersed therewith to be thrown out of said solution, and mechanically flocculating said mass to facilitate the throwing out of the CaSO₄ precipitate carrying silica from said solution.

6. In the method for recovering manganese from manganese bearing ores containing silica, the steps of forming an ore pulp mass including a free acid containing manganese sulfate solution which contains silica in a dissolved and dispersed state and having an acidity corresponding to a pH value of between 1.0 and 2.5, and treating said mass with a basic material capable of forming a precipitate upon reaction with said acid in an amount such as to reduce its acidity corresponding to a pH value of between 4.5 and 5.2 to thereby cause the precipitate formed by reaction of the basic material with said acid and carrying the silica interspersed therewith to be thrown out of said solution.

7. In the method for recovering manganese from manganese bearing ores containing silica, the steps of forming an ore pulp mass including a free sulfuric acid containing manganese sulfate solution which contains silica in a dissolved and dispersed state and having an acidity corresponding to a pH value of between 1.0 and 2.5, and treating said mass with a basic material selected from the group consisting of calcium oxide, calcium hydroxide, calcium carbonate, and capable of forming a precipitate upon reaction with said sulfuric acid in an amount such as to reduce its acidity corresponding to a pH value of between 4.5 and 5.2 to thereby cause the CaSO₄ precipitate formed by reaction of the selected calcium compound with said acid and carrying the silica therewith to be thrown out of said solution.

8. In the method for recovering manganese from manganese bearing ores containing silica and iron, the steps of treating an ore pulp mass including a free acid containing solution of manganese and ferrous sulfates having the silica dissolved and dispersed therein with a basic material capable of forming a precipitate upon reaction with said acid in such amount as to neutralize said acid to a degree such that the acidity of said solution corresponds to a pH value of between 4.5 and 5.2 to thereby cause the precipitate formed by reaction of the basic material with said acid and carrying the silica interspersed therewith to be thrown out of said solution, and subjecting said mass to an oxidation to convert said ferrous compound to the ferric state to thereby cause precipitation of the ferric compound out of said solution.

9. The method for recovering manganese from manganese bearing ores containing iron and silica which comprises treating the ore suspended in an aqueous medium with sulfur dioxide and sulfuric acid as to dissolve the manganese out of the ore and form a mass including a free acid containing solution of manganese and ferrous sulfates having the silica dissolved and dispersed therein, the sulfur dioxide and sulfuric acid being employed in such quantities as to give to said mass an acidity corresponding to a pH value of between 1.0 and 2.5, subjecting said mass to an oxidation to convert the ferrous sulfate to the ferric state, and treating said mass with a basic material capable of forming a precipitate upon reaction with said free acid in an amount such as to reduce its acidity corresponding to a pH value of between 4.5 and 5.2 to thereby cause the precipitate formed by reaction of the basic material with said acid and carrying the silica interspersed therewith together with a ferric compound precipitate to be thrown out of said solution.

10. The method for recovering manganese from manganese bearing ores containing iron and silica which comprises treating the ore suspended in an aqueous medium with sulfur dioxide and sulfuric acid as to dissolve the manganese out of the ore and form a mass including a free acid containing solution of manganese and ferrous sulfates having the silica dissolved and dispersed therein, the sulfur dioxide and sulfuric acid being employed in such quantities as to give to said mass an acidity corresponding to a pH value of between 1.0 and 2.5, treating said mass with a basic material capable of forming a precipitate upon reaction with said free acid in an amount such as to reduce its acidity corresponding to a pH value between 4.5 and 5.2 to thereby cause the precipitate formed by reaction of the basic material with said acid and carrying the silica interspersed therewith to be thrown out of said solution, and subjecting said mass to an oxidation to convert the ferrous sulfate to the ferric state, thereby causing the ferric compound to be precipitated out of said solution.

11. The method for recovering manganese from manganese bearing ores containing iron and silica which comprises treating the ore with an acidic reagent as to dissolve the manganese out of the ore and form a mass including a solution of manganese and ferrous sulfates having the silica dissolved and dispersed therein, the reagent being employed in such quantity as to give to said mass an acidity corresponding to a pH value of between 1.0 and 2.5, treating said mass to an oxidation to convert the ferrous compound to the ferric state, treating said mass with a basic material capable of forming a precipitate upon reaction with said reagent in such amount as to reduce its acidity corresponding to a pH of between 4.5 and 5.2 to thereby cause the precipitate formed by reaction of the basic material with said reagent and carrying the silica interspersed therewith together with a precipitate of the ferric compound to be thrown out of said solution, and recovering a purified manganese compound solution.

12. The method for recovering manganese from manganese bearing ores containing iron and silica which comprises treating an ore pulp mass including a free acid containing solution of manganese and ferrous sulfates having the silica dissolved and dispersed therein with a basic material capable of forming a precipitate upon reaction with said acid in such amount as to neutralize said acid to a degree such that its acidity corresponds to a pH value of between 4.5 and 5.2 to thereby cause the precipitate formed by reaction of the basic material with said acid and carrying the silica interspersed therewith to be thrown out of said solution, subjecting said mass to an oxidation of such character as to convert only a predetermined amount of said ferrous compound to the ferric state to thereby cause precipitation of the ferric compound out of said solution, and recovering a manganese and ferrous compounds containing solution.

13. In the method for recovering manganese from manganese bearing ores containing silica, the steps of treating an ore pulp mass including sulfuric acid containing manganese sulfate solution which contains silica in a dissolved and dispersed state with a basic material capable of forming a precipitate upon reaction with said acid and selected from the group consisting of calcium oxide, calcium hydroxide, calcium carbonate, in such amount as to thereby cause the $CaSO_4$ precipitate formed by reaction of the selected calcium compound with said acid and carrying the silica interspersed therewith to be thrown out of said solution, and flocculating the mass to facilitate the throwing out of the precipitate carrying silica from the solution.

14. In a method for recovering manganese from manganese bearing ores containing silica, the step of treating an ore pulp mass including an acid selected from the group consisting of sulfuric, sulfurous and mixtures thereof, containing manganese sulfate in solution, and silica in a dissolved and dispersed state, with a basic material capable of forming a precipitate upon reaction with said acid in such amount as to only partially neutralize said acid to thereby cause formation of the precipitate by reaction of the basic material with said acid and carrying the silica interspersed therewith to be thrown out of said solution.

JOHN R. ALLEN.

No references cited.